(12) United States Patent
Pechanec et al.

(10) Patent No.: US 10,114,745 B2
(45) Date of Patent: Oct. 30, 2018

(54) ASSISTED GARBAGE COLLECTION IN A VIRTUAL MACHINE

(71) Applicant: Red Hat, Inc., Raleigh, NC (US)

(72) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 263 days.

(21) Appl. No.: 14/507,990

(22) Filed: Oct. 7, 2014

(65) Prior Publication Data

US 2016/0098346 A1     Apr. 7, 2016

(51) Int. Cl.
*G06F 12/02* (2006.01)

(52) U.S. Cl.
CPC .. *G06F 12/0261* (2013.01); *G06F 2212/7205* (2013.01)

(58) Field of Classification Search
CPC .............. G06F 12/0253; G06F 2212/702
See application file for complete search history.

(56) References Cited

U.S. PATENT DOCUMENTS

| | | | |
|---|---|---|---|
| 6,701,334 B1 * | 3/2004 | Ye | G06F 9/44594 |
| 7,475,214 B2 | 1/2009 | Hwang | |
| 7,904,493 B2 | 3/2011 | Schmelter et al. | |
| 7,912,877 B2 | 3/2011 | Shankar et al. | |
| 7,971,010 B2 | 6/2011 | Schmelter et al. | |
| 8,667,471 B2 | 3/2014 | Wintergerst et al. | |
| 8,825,721 B2 * | 9/2014 | Hunt | G06F 12/0276 707/819 |
| 2014/0082315 A1 * | 3/2014 | Moser | G06F 12/0253 711/170 |

FOREIGN PATENT DOCUMENTS

AU      WO2013163679 A1      11/2013

OTHER PUBLICATIONS

Stephen M. Blackburn, Pretenuring for Java, In: OOPSLA '01 Proceedings of the 16th ACM SIGPLAN conference on Object-oriented programming, systems, languages, and applications, Oct. 1, 2001, ACM.*

(Continued)

*Primary Examiner* — Kenneth M Lo
*Assistant Examiner* — Istiaque Ahmed
(74) *Attorney, Agent, or Firm* — Lowenstein Sandler LLP (57) ABSTRACT

This application relates to receiving, by a processing device executing a virtual machine, bytecode including an object to be loaded into a memory space, the object being tagged with a garbage collection descriptor. The garbage collection descriptor is generated according to an annotation to the object in a source code. The application further provides for determining, in view of the garbage collection descriptor, a region of the memory space to store the object, in which the memory space includes a first region to store a first set of objects that have survived less than a determined number of rounds of garbage collection and a second region to store a second set of objects that have survived at least the determined number of rounds of garbage collection in the first region. The application further provides for storing the object in the region of the memory space and adding the object to one of the first objects or the second set of objects in view of the region.

18 Claims, 4 Drawing Sheets

(56) References Cited

OTHER PUBLICATIONS

David Ungar, An Adaptive Tenuring Policy for Generation Scavengers, In: ACM Transactions on Programming Languages and Systems, Jan. 1992, ACM, p. 26.*
Matthieu, JVM memory and Java heap space, The Java-Hoster Blog 2011, [retrieved on Aug. 18, 2016] Retrieved from the Internet: <URL: http://blog.java-hoster.com/2011/java-course/performance/jvm-memory-and-java-heap-space>.*
Interface MemoryMXBean, Java™ Platform, Standard Edition 8 API Specification, Jul. 6, 2014, [retrieved on Aug. 19, 2016], Retrieved from the Internet: <URL: https://docs.oracle.com/javase/8/docs/api/java/lang/management/MemoryMXBean.html>.*
"Why Make Short and Long-lived Objects a Difference in Garbage Collection?", stackoverflow.com, Aug. 27, 2014 pp. 1-4 http://stackoverflow.com/questions/2620533/why-make-short-and-long-lived-objects-a-difference-in-garbage-collection.
Reames, Philip, and Necula, George, "Toward Hinted Collection, Annotations for Decreasing Garbage Collector Pause Times", ISMM, Jun. 20-21, 2013, Seattle, WA, USA 12 pages http://www.cs.berkeley.edu/~necula/Papers/hinted-collection-ismm13.pdf.
Ghike, Swapnil, "Garbage Collection Optimization for High-Throughput and Low-Latency Java Applications", posted Apr. 4, 2014, 5 pages https://engineering.linkedin.com/garbage-collection/garbage-collection-optimization-high-throughput-and-low-latency-java-applications.

\* cited by examiner

ASSISTED GARBAGE COLLECTION IN A VIRTUAL MACHINE

TECHNICAL FIELD

This disclosure relates to a virtual machine and, in particular, to garbage collection in the virtual machine.

BACKGROUND

A virtual machine, such as the Java™ Virtual Machine (JVM), may include a garbage collection module (herein referred to as a "garbage collector") to perform one or more rounds of garbage collection on objects stored in memory during execution of the program containing the object. A round of garbage collection may include operations (herein referred to as "garbage collection operations") to identify and delete unused objects from a memory space. The memory space is a portion of the memory assigned to the virtual machine. Using the JVM as an example, a Java garbage collector of the JVM may, on behalf of users (such as programmers), manage the allocation of an object to a memory space and the deallocation of the object from the memory space. Each Java object may have a life time in the memory space measured according to how many rounds of garbage collection the Java object has survived. A Java object survives a round of garbage collection if the Java object is not deleted from the memory space. The memory space may be partitioned into multiple regions to store Java objects of different ranges of life time. For example, in a generational garbage collection scheme, the memory space may be partitioned into three regions. The JVM may store Java objects that have been just or recently created in a first region (herein referred to as a "young generation region"). The JVM may copy the Java objects stored in the young generation region after surviving a pre-determined number of rounds of garbage collections to a second region (herein referred to as an "old generation region" or a "tenured generation region"). Further, the JVM may store certain Java objects (such as Java class objects) that are used by the JVM in a third region (herein referred to as a "permanent generation region"). Garbage collections are performed often for Java objects stored in the young generation region, less often for Java objects stored as the old or tenured generation region, and rarely for Java objects stored as the permanent generation region.

The garbage collector of a JVM may automatically perform rounds of generational garbage collection. The Java source code (coded by a user) does not specify how each round of garbage collection is performed. However, in certain situations, the JVM itself cannot accurately determine which Java object is long-lived and which Java object is short-lived, and the default generational garbage collection of JVM may not be optimal for certain Java objects that are known to have a long life.

BRIEF DESCRIPTION OF THE DRAWINGS

The present disclosure is illustrated by way of example, and not by way of limitation, in the figures of the accompanying drawings.

DETAILED DESCRIPTION

Implementations of the present disclosure provide systems and methods of assisted garbage collection associated with objects in a computing environment. Instead of relying on default protocols of a garbage collector of a virtual machine, implementations of the present disclosure enables the use of annotation (herein referred to as "garbage collection annotations") in association with objects (or a class of objects) in the source code. The garbage collection annotations may include identifiers to garbage collection rules to instruct the virtual machine to perform garbage collection operations according to the garbage collection rules, rather than following the default garbage collection protocols. A compiler may compile the source code with the objects and the garbage collection annotations into bytecodes to be executed by the virtual machine. The compiler may also convert each garbage collection annotation into metadata (herein referred to as a "garbage collection descriptor") including an identifier (or a reference) to a corresponding garbage collection rule. During execution of the bytecodes, the virtual machine may perform one or more rounds of garbage collection operations on the objects according to the rules specified in the garbage collection descriptors. In this way, the virtual machine may perform one or more rounds of garbage collection operations according to the garbage collection annotations specified by a user in the source code to achieve the assisted garbage collection in the virtual machine.

Implementations of the present disclosure relate to a method including receiving, by a processing device executing a virtual machine, bytecode comprising an object to be loaded into a memory space, the object being tagged with a garbage collection descriptor, wherein the garbage collection descriptor is generated according to an annotation to the object in a source code, determining, in view of the garbage collection descriptor, a region of the memory space to store the object, wherein the memory space comprises a first region to store a first set of objects that have survived less than a pre-determined number of rounds of garbage collection and a second region to store a second set of objects that have survived at least the pre-determined number rounds of garbage collection in the first region, and storing the object in the region of the memory space.

Implementations of the present disclosure relate to a system including a memory and a processing device, operationally coupled to the memory, to execute a virtual machine. The processing device is to receive bytecode comprising an object to be loaded into a memory space, the object being tagged with a garbage collection descriptor, wherein the garbage collection descriptor is generated according to an annotation to the object in a source code, determine, in view of the garbage collection descriptor, a region of the memory space to store the object, wherein the memory space comprises a first region to store a first set of objects that have survived less than a pre-determined number of rounds of garbage collection and a second region that is to store a second set of objects that have survived at least the pre-determined number of rounds of garbage collection in the first region, and store the object in the region of the memory space.

In the following descriptions, the Java™ programming language is used as an exemplary programming language, and the Java Virtual Machine (JVM) is used as an exemplary virtual machine (also known as a language virtual machine or a process virtual machine) for the simplicity and convenience of explanation. Implementations of the present disclosure are equally applicable to other programming languages and virtual machines other than Java (e.g., Microsoft® .NET Common Language Runtime (CLR)).

Figure 1:
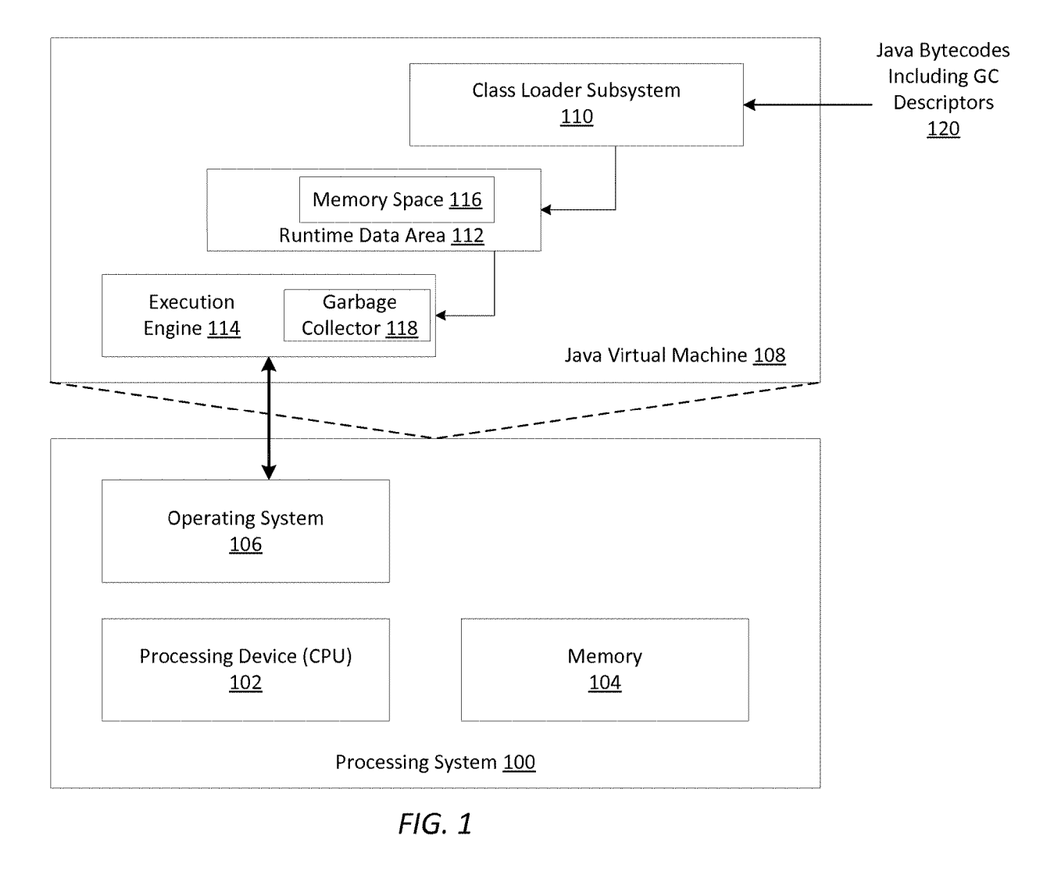
FIG. 1 illustrates an exemplary processing system including one or more rounds garbage collection operations according to one or more implementations of the present disclosure.

FIG. 1 illustrates an exemplary processing system 100 configured to perform one or more rounds of garbage collection operations according to some implementations of the present disclosure. Referring to FIG. 1, the processing system 100 may include a processing device 102 (such as a central processing unit (CPU) with one or more processing cores) and a memory device 104 coupled to the processing device 102. The processing system 100 may be any type of computing devices including, but not limited to, a computer, a tablet computer, or a mobile phone (such as a smart phone). The memory device 104 may store executable instructions of software applications and the data associated with execution of the software applications. The processing device 102 coupled to the memory may execute the instructions of the software applications. In one implementation, the software applications may be developed in the Java language in the form of Java source code which is compiled by a Java compiler into Java bytecodes. The Java byte code may be executed by a Java Virtual Machine 108 executing on the processing device 102.

In one implementation, the processing system 100 may include other resources (not shown) such as networking resources and hard drives. An operating system 106 may serve as a software layer to the software applications with an abstract computer model to handle and manage all the resources of the processing system 100.

Different processing systems 100 may run different computing platforms. For example, processing systems 100 may run on a Windows® operating system or on a Linux® operating system. In one implementation, to achieve code portability among different computing platforms, a Java Virtual Machine (JVM) 108 may be executed as a software layer above the operating system 106 of the processing device 102. Java programs executed in the JVM 108 interact with the JVM 108 as if the JVM 108 is a machine (a virtual machine) to the Java program. The Java programs are written using the same set of interfaces and libraries in Java. Each JVM implementation for a specific local operating system may translate the Java instructions (such as Java bytecodes) into instructions that run on the local operating system. In this way, a Java program may achieve platform independence.

The source code of a Java program may be first developed in a Java development environment and compiled using a Java compiler into Java bytecodes that are executable by the JVM 108. A Java bytecode includes an instruction set executable on the JVM 108. A Java bytecode may include one or more bytes that represent the instructions and optional one or more bytes for passing parameters for the instructions.

A Java source code may include one or more Java objects. A Java object may include a set of states stored in fields of the Java object and a set of methods that operate on the set of states. For example, a string object may include a field to store a string of characters and a method to input the string of characters into the field. A class of object may define a template (or blueprint) of the states and methods for a group of Java objects. Thus, Java objects that are declared using a Java class may include a same set of fields (that may store different data values) and a same set of methods that operate on data stored in the fields.

The Java source code may also include Java annotations. A Java annotation is specifically marked text (e.g. text following the "@" sign) in the source code associated with one or more Java objects. The Java annotation does not change the operation of the Java program. However, the Java annotation may be converted by the Java compiler into metadata in the bytecodes to instruct the Java compiler or to the JVM 108 to perform certain optimizations during execution of the bytecodes. A Java annotation may be associated with a Java object such that the message contained in the Java annotation and transmitted to the Java compiler or the JVM 108 is with respect to the Java object. The Java annotation may also be associated with a Java class of Java object such that the message contained in the Java annotation transmitted to the Java compiler or the JVM 108 is with respect to Java objects in the Java class.

The Java compiler may compile a Java source code including Java objects and Java annotations into Java bytecodes that may be executed on the JVM 108. The Java bytecodes may be stored in Java class files (.class files). In one implementation, the JVM 108 may include a class loader subsystem 110, runtime data areas 112, and an execution engine 114. The class loader subsystem 110 is a module of the JVM 108 to load Java class files including Java objects. The runtime data areas 112 are different memory areas that the JVM 108 uses to store different data items (such as the bytecodes, Java objects, Java stacks etc.). In one implementation, the runtime data areas 112 may include a memory space 116 (e.g., a heap memory space) to store the Java objects contained in the Java class file loaded in the class loader subsystem 110. The execution engine 114 may execute the instructions associated with the methods of the objects loaded in the memory space 116 of the runtime data areas 112.

In one implementation, the execution engine 114 may include a garbage collector 118 to provide one or more rounds of garbage collection to Java objects stored in the memory space 116. Garbage collection is the process for the garbage collector 118 to examine the memory space, identify which Java objects are in use and which Java objects are not, and delete the unused Java objects. An in-use Java object (herein referred to as a "referenced Java object") means that some part of the Java program maintains a pointer to the Java object. An unused Java object (herein referred to as an "unreferenced Java object") is no longer referenced by any part of the Java program. In Java, the garbage collection is typically handled automatically by the garbage collector 118. A round of garbage collection may occur according to a schedule (such as periodically) or in response to an event (such as a fill-up in a region of the memory space).

In certain implementation of JVMs, the garbage collector 118 may use a generational garbage collection scheme. Under the generational garbage collection scheme, the memory space 116 may include a first region to store Java objects of a young generation region, a second region to store Java objects of an old (or tenured) generation region, and a third region to store Java objects of a permanent generation region as discussed above.

In some implementations, the garbage collector 118 automatically stores the Java objects into the first region of the memory space 104 after the Java objects are loaded in the JVM 108 by the class loader subsystem 110. The garbage collector 118 may perform one or more rounds of garbage collection (referred to as "minor garbage collections") on the Java objects stored in the first region according to a schedule. These rounds of minor garbage collection may identify and delete unreferenced Java objects stored in the first region while referenced Java objects in the first region may survive the minor garbage collections and stay in the first region. The garbage collector 118 may track how many garbage collection rounds each Java object in the first region has survived the garbage collection. For Java objects in the first region that have survived less than a pre-determined number (e.g., eight) of rounds of minor garbage collections, the garbage collector 118 may keep these Java objects in the first region. For Java objects that have survived at least the pre-determined number of minor garbage collections, the garbage collector 118 may copy these Java objects to the second region of the memory space 116 (called a promotion from the young generation region to the old generation region).

The Java objects stored in the second or old generation region do not subject to minor garbage collections performed on Java objects stored in the first or young generation region. Instead, the garbage collector 118 may perform one or more rounds of major garbage collection on all Java objects stored in the first and second regions of the memory space 116. The major garbage collection is a stop-the-world event in the sense that the JVM 108 may stop execution of Java objects by the execution engine 114 to perform a round of major garbage collection. Therefore, the major garbage collections are performed less frequently than the minor garbage collections. In one implementation, a round of major garbage collection is triggered because the second region is filled up by Java objects.

The JVM 108 may use the third or permanent generation region of the memory space 116 to store certain Java objects that are intrinsic to the execution engine 114. For example, the JVM may store class and method definitions in the third region. The data items stored in the third region of the memory space 116 commonly do not subject to the minor or major garbage collections. Instead, they are deleted when the JVM 108 determines that the definition of a class or a method is no longer needed and the space may be needed for other classes or methods. The permanent generation is included in a round of full garbage collection of the JVM 108.

In one implementation, the first and second regions of the memory space 116 may be a heap memory, and the third region is a non-heap memory.

The generational garbage collection scheme as described above provides the convenience of automatic garbage collection without the need to manually perform memory allocation and deallocation in the source code. The garbage collection is done according to default garbage collection protocols without user's (programmer) awareness or input. However, in certain situations, the default garbage collection protocols of the JVM 108 are not optimal. It may be desirable to provide the user with the option to specify aspects of the garbage collection behaviors.

In some implementations of the present disclosure, a set of garbage collection rules may be specified and stored in a data store (such as the memory 104). The set of garbage collection rules may specify garbage collection behaviors that deviate from the default garbage collection protocols of the JVM 108. The set of garbage collection rules may be defined by the user or by the provider of the JVM 108. Some implementations of the present disclosure may enable a Java source code developer to associate one or more garbage collection annotation with a Java object or a class of Java objects. Each garbage collection annotation may include an identifier to a garbage collection rule. When the Java object is compiled into bytecodes, the Java object may be tagged with a garbage collection descriptor that is generated according to the garbage collection annotation associated with the Java object in the source code. The garbage collection descriptor may include the identifier or reference to the garbage collection rule.

In response to receiving a Java object (in bytecodes) from the class loader subsystem 110, the garbage collector 118 may determine whether the Java object is tagged with a garbage collection descriptor. If the Java object is not tagged with a garbage collection descriptor, the JVM 108 may store the Java object in the first region to go through the garbage collection according to the default JVM garbage collection protocol. If the Java object is tagged with a garbage collection descriptor, the JVM 108 may perform one or more rounds of garbage collection on the Java object according to the garbage collection rule identified by the garbage collection descriptor.

Figure 2:
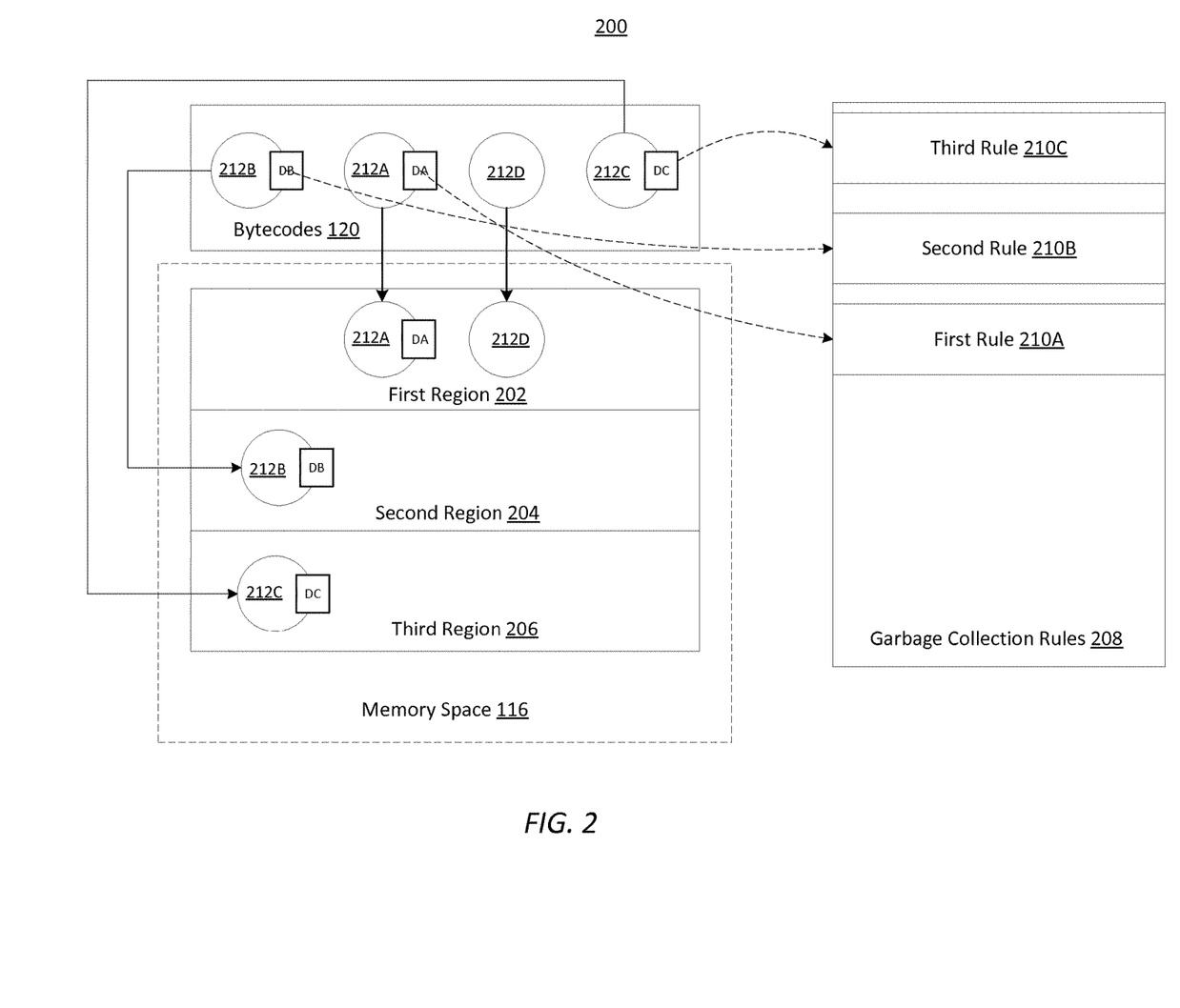
FIG. 2 illustrates exemplary operations of the assisted garbage collection according to one or more implementations of the present disclosure.

FIG. 2 illustrates exemplary operations of the assisted garbage collection according to some implementations of the present disclosure. In one implementation, the memory space 116 may include a first region 202 to store Java objects of young generation region, a second region 204 to store Java objects of old generation region, and third region 206 to store Java objects of permanent generation region.

In one implementation, the class loader subsystem 110 of the JVM 108 may load bytecodes 120 into the JVM 108. The bytecodes 120 may include one or more Java objects 212A-212D. Some of the Java objects (such as 212D) are not tagged with a garbage collection descriptor. Some of the Java objects (such as 212A-212C) are tagged with a garbage collection descriptor. As described above, the garbage collection descriptor tagged to a Java object may be generated by a Java compiler from use-specified garbage collection annotations associated with the Java object or with the class of the Java object.

Referring to FIG. 2, each of the garbage collection descriptors DA-DC tagged to the Java objects 212A-212C may include an identifier or reference to a garbage collection rule 210A-210C stored in a garbage collection rules database 208. The reference included in a garbage collection descriptor may be an identifier or a link to a garbage collection rule stored in the garbage collection rule database 208. Each of the garbage collection rule 210A-210C may define one or more garbage collection operations on the Java object. In one implementation, prior to storing the Java objects 212A-212D in the memory space 116 of the runtime data areas 112, may first examine each Java object 212A-212D to determine whether the Java object is tagged with a garbage collection descriptor. If the JVM 108 determines that a Java object (such as 212D) is not tagged with a garbage collection descriptor, the JVM 108 may store the Java object in the first region 202 to undergo the default generational garbage collection. If the JVM 108 determines that the Java object (such as 212A-212C) is tagged with a garbage collection descriptor, the JVM 108 may store the Java object in a region of the memory space 116 and perform garbage collections according to the garbage collection rules (such as 210A-210C) referenced in the garbage collection descriptors DA-DC.

In an exemplary implementation, a Java source code may include a first Java annotation (e.g., represented by @Temporary for the convenience of explanation) associated with the Java object 212A. The @Temporary annotation may be associated with the Java object 212A directly or associated with a Java class to which the Java object 212A is declared. After compilation, the Java annotation of @Temporary associated with the Java object 212A may be converted into the garbage collection descriptor DA tagged to the Java object 212A. The garbage collection descriptor DA may include a reference to the garbage collection rule 210A stored in the garbage collection rule database 208. In one implementation, the garbage collection rule 210A referenced by the garbage collection descriptor DA provides that the Java object 212A is to be stored in the first region 202 and stay in the first region not to be promoted even if the Java object 212A has survived a pre-determined number of rounds of garbage collection that is set for promoting a Java object according to the default garbage collection protocol.

This deviation from the default garbage collection protocol may be useful for situations when a Java object is embedded in an HTTP session associated with one user. The user may use the HTTP session for a long time, but the Java object is valid only if the HTTP session is valid. It is advantageous to mark the Java object in the HTTP session with the @Temporary annotation to inform the JVM 108 not to promote the Java object from the young to the old generation region.

In an exemplary implementation, a Java source code may include a second Java annotation (e.g., represented by @Tenured for the convenience of explanation) associated with the Java object 212B. The @Tenured annotation may be associated with the Java object 212B directly or associated with a Java class to which the Java object 212B is declared. After compilation, the Java annotation of @Tenured associated with the Java object 212B may be converted into the garbage collection descriptor DB tagged to the Java object 212B. The garbage collection descriptor DB includes a reference to the garbage collection rule 210B stored in the garbage collection rule database 208. In one implementation, the garbage collection rule 210B linked to the garbage collection descriptor DB provides that the Java object 212B is to be loaded in the second region 204 directly from the class loader subsystem 110 bypassing the first region 202. In response to identifying the Java object 212B is tagged with the garbage collection descriptor DB, the JVM 108 is to load the Java object 212B into the second region 204 so that the Java object 212B may skip the minor garbage collections associated with the first region and the promotion process from the first region 202.

In an exemplary implementation, a Java source code may include a third Java annotation (e.g., represented by @Permanent for the convenience of explanation) associated with the Java object 212C. The @Permanent annotation may be associated with the Java object 212C directly or associated with a Java class to which the Java object 212C is declared. After compilation, the Java annotation of @Permanent associated with the Java object 212C may be converted into the garbage collection descriptor DC tagged to the Java object 212C. The garbage collection descriptor DC includes a reference to the garbage collection rule 210C stored in the garbage collection rule database 208. In one implementation, the garbage collection rule 210C linked to the garbage collection descriptor DC provides that the Java object 212C is to be loaded into the third region 206 directly from the class loader subsystem 110 bypassing the first and second regions 202, 204. For example, a Java application may include a dependency injection container object whose life may span for the life of the Java application. It may be advantageous to directly store the dependency injection container object in the third region 206 bypassing the minor or major garbage collections performed on Java objects stored in the first and second regions. In response to identifying the Java object 212C is tagged with the garbage collection descriptor DC, the JVM 108 is to load the Java object 212C into the third region 206 of the permanent generation skipping the default generational garbage collection scheme.

In one exemplary implementation, the garbage collection annotation associated with a Java object may also include assigning certain parameter values to the corresponding garbage collection rules. For example, a garbage collection annotation represented by @ Permanent (collectStrategy=NEVER) may be associated with a garbage collection rule that informs the JVM 108 to refrain from performing any garbage collection on the tagged Java object. In an example, the garbage collection annotation represented by @ Temporay(promoteNumberGC=5) may be associated with a garbage collection rule that informs the JVM 108 to store the tagged Java object in the first region and promote the Java object to the second region if the Java object has survived five rounds of minor garbage collection. In this way, the tagged Java object may be promoted at a pace specified in the Java source code by a user.

Figure 3:
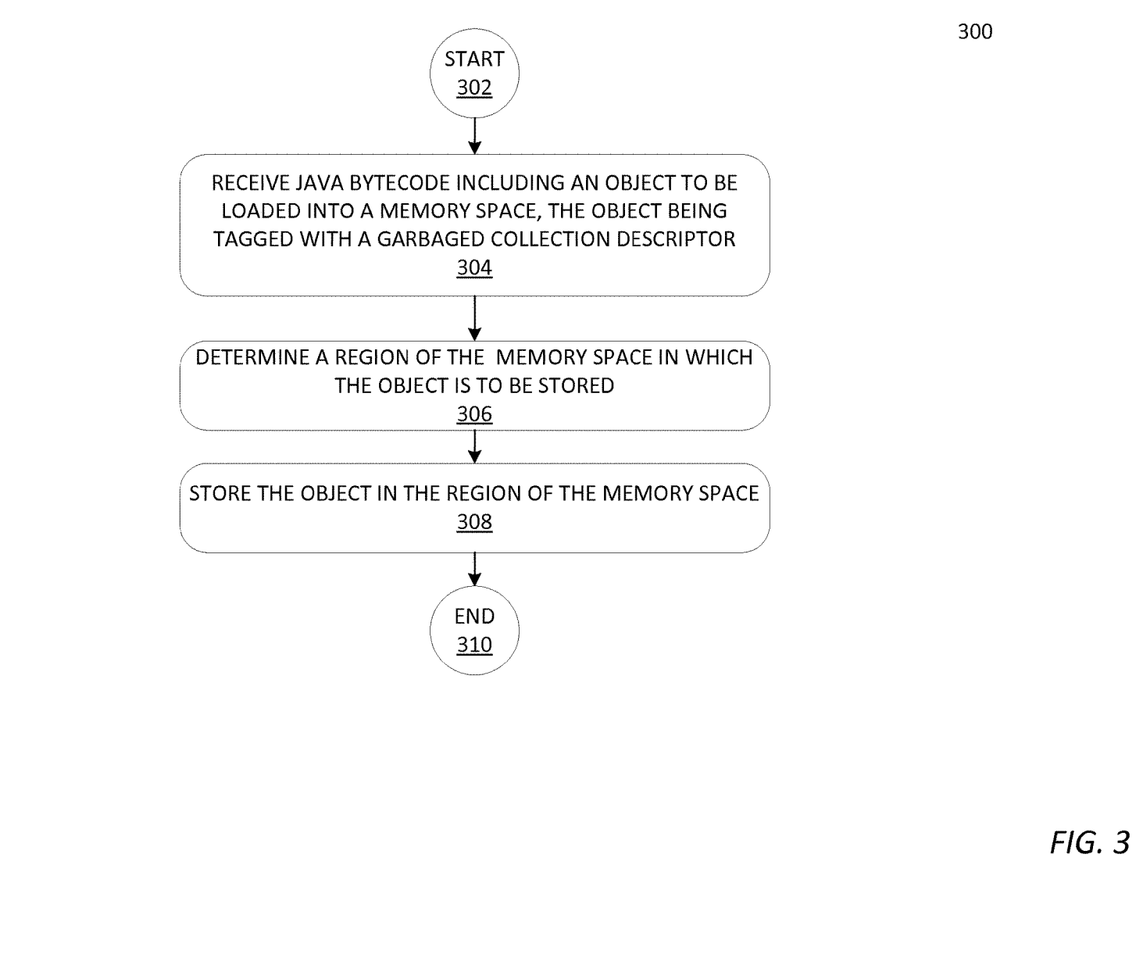
FIG. 3 a flow diagram illustrating a method to perform the assisted garbage collection operations according to one or more implementations of the disclosure.

FIG. 3 is a flow diagram illustrating a method 300 to perform the assisted garbage collection according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the processing device 102 executing the operating system 106 and the JVM 108 as shown in FIG. 1.

Referring to FIG. 3, at 302, the processing logic may start the operations of the assisted garbage collection. For example, the processing logic may execute a virtual machine (such as JVM 108) for executing bytecodes (such as Java bytecodes) including objects. At 304, the virtual machine may receive a bytecode including an object to be loaded into a memory region of a runtime data area (or memory space) of the virtual machine. The object may be tagged with a garbage collection descriptor that is generated according to a garbage collection annotation associated with the object in a source code from which the bytecode is generated.

At 306, the virtual machine may determine a region of the memory space to store the object in view of the instructions stored in the garbage collection descriptor. In an exemplary implementation, the memory space may include one or more regions that are partitioned according to a default generational garbage collection scheme. For example, the memory space may include a first region to store a first set of objects that have not survived a pre-determined number of rounds of minor garbage collection, and a second region to store a second set of objects that have survived at least the pre-determined rounds of minor garbage collection in the first region.

At 308, the virtual machine may store the object in the region determined according to the garbage collection rule identified by the garbage collection descriptor. In this way, the default garbage collection scheme of the virtual machine may be supplemented with an expansive set of garbage collection rules.

Figure 4:
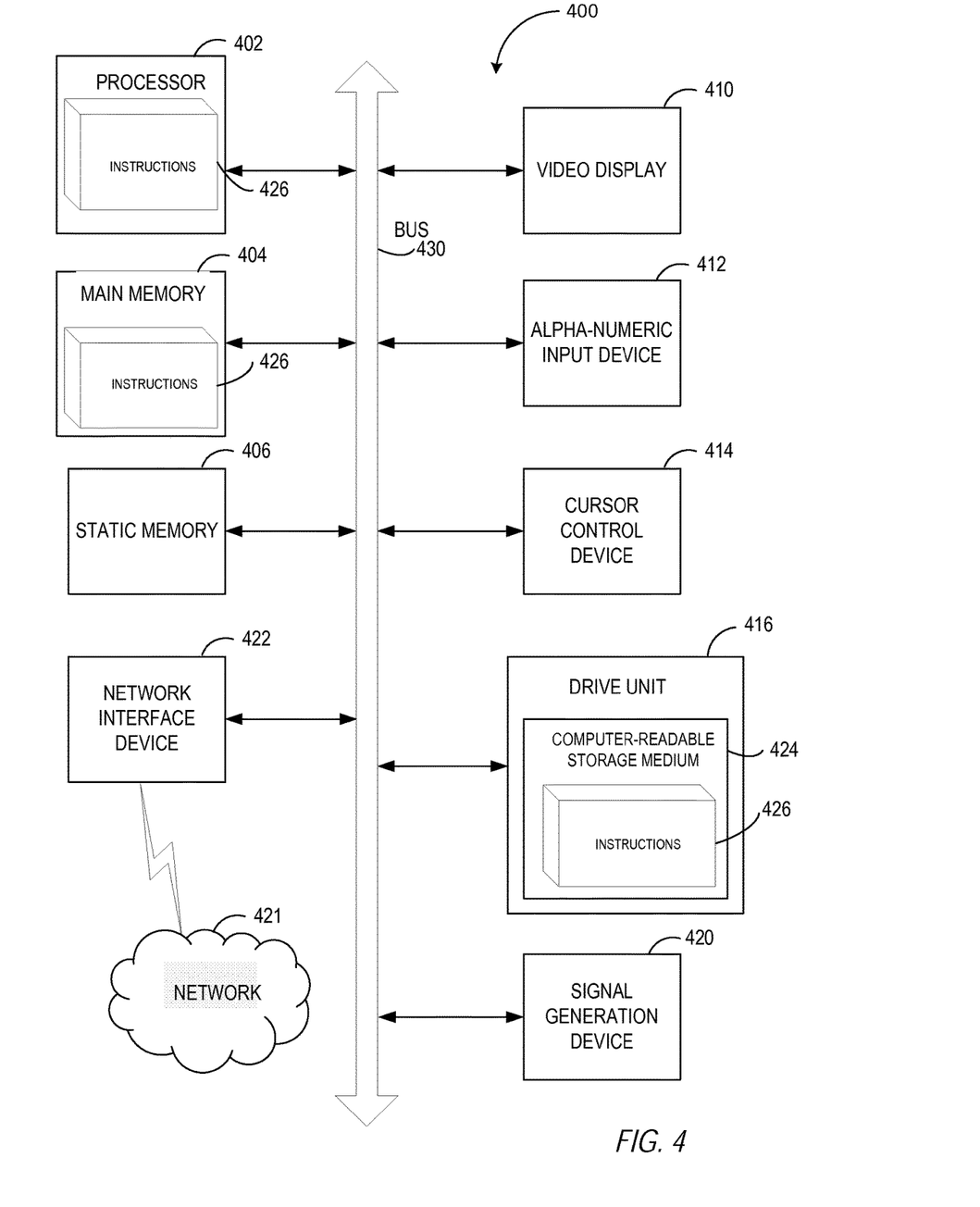
FIG. 4 is a block diagram illustrating an exemplary computer system according to one or more implementations of the disclosure.

FIG. 4 illustrates a diagrammatic representation of a machine in the exemplary form of a computer system 400 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., the garbage collector 118 of the JVM 108 as shown in FIG. 1). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 722.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving, by a processing device of virtual machine, bytecode comprising a bytecode object and a garbage collection descriptor associated with the bytecode object, the garbage collection descriptor comprising an identifier of a garbage collection rule stored in a garbage collection rule database, wherein the garbage collection rule database stores a plurality of garbage collection rules specifying garbage collections to be performed on bytecode objects;

responsive to determining that the garbage collection descriptor indicates a first type of garbage collection in view of the garbage collection rule associated with the identifier in the garbage collection descriptor, storing the bytecode object in a first region of a memory associated with the processing device, wherein the first region is utilized for storing a first set of bytecode objects that have persisted for fewer than a determined number of rounds of garbage collection operations;

responsive to determining that the garbage collection descriptor indicates a second type of garbage collection in view of the garbage collection rule associated with the identifier in the garbage collection descriptor, storing the bytecode object directly in a second region of the memory associated with the processing device bypassing the first region, wherein the second region is utilized for storing a second set of bytecode objects that have persisted for at least the determined number of rounds of garbage collection operations in the first region;

responsive to determining that the garbage collection descriptor indicates a third type of garbage collection in view of the garbage collection rule associated with the identifier in the garbage collection descriptor, storing the bytecode object directly in a third region of the memory associated with the processing device bypassing the first region and second region, wherein the third region is to store a third set of bytecode objects until the third set of bytecode objects are destructed responsive to a class, associated with each of the third set of bytecode objects, being unloaded from the virtual machine; and performing the garbage collection operation on the bytecode object in accordance with the garbage collection descriptor.

2. The method of claim 1, wherein the virtual machine is a Java™ Virtual Machine (JVM), the bytecode object is a Java object, the source code is Java source code, and the annotation is a Java annotation.

3. The method of claim 1, wherein the garbage collection descriptor comprises a reference to a garbage collection rule according to which the virtual machine performs the garbage collection operation on the bytecode object.

4. The method of claim 3, wherein the garbage collection rule is to instruct the virtual machine to skip a round of garbage collection operations on the bytecode object.

5. The method of claim 3, wherein the garbage collection rule is to instruct the virtual. machine to keep the bytecode object in the first region regardless of whether the bytecode object has survived the determined number of rounds of garbage collection operations.

6. The method of claim 3, wherein the garbage collection rule is to instruct the virtual machine to bypass the first region and to store the bytecode object in the second region.

7. The method of claim 3, wherein the garbage collection rule is to instruct the virtual machine to bypass the first region or second region and to store the bytecode object in the third region.

8. The method of claim 3, wherein the garbage collection rule is to instruct the virtual machine to deviate from a default garbage collection operation of the virtual machine.

9. The method of claim 1, wherein the annotation is associated with a class of the bytecode object, and wherein each bytecode object declared to the class in the source code, after compilation, is tagged with the garbage collection descriptor.

10. The method of claim 3, wherein the first region and the second region of the memory space are heap memory, and the third region is non-heap memory.

11. A non-transitory machine-readable storage medium storing instructions which, when executed, cause a processing device to:

receive, by the processing device of a virtual machine, bytecode comprising a bytecode object and a garbage collection descriptor associated with the bytecode object, the garbage collection descriptor comprising an identifier of a garbage collection rule stored in a garbage collection rule database, wherein the garbage collection rule database stores a plurality of garbage collection rules specifying garbage collections to be performed on bytecode objects;

responsive to determining that the garbage collection descriptor indicates a first type of garbage collection in view of the garbage collection rule associated with the identifier in the garbage collection descriptor, store the bytecode object in a first region of a memory associated with the processing device, wherein the first region is utilized for storing a first set of bytecode objects that have persisted for fewer than a determined number of rounds of garbage collection operations;

responsive to determining that the garbage collection descriptor indicates a second type of garbage collection in view of the garbage collection rule associated with the identifier in the garbage collection descriptor, store the bytecode object directly in a second region of the memory associated with the processing device bypassing the first region, wherein the second region is utilized for storing a second set of bytecode objects persisted for at least the determined number of rounds of garbage collection operations in the first region;

responsive to determining that the garbage collection descriptor indicates a third type of garbage collection in view of the garbage collection rule associated with the identifier in the garbage collection descriptor, store the bytecode object directly in a third region of the memory associated with the processing device bypassing the first region and second region, wherein the third region is to store a third set of bytecode objects until the third set of bytecode objects are destructed responsive to a class, associated with each of the third set of bytecode objects, being unloaded from the virtual machine; and perform the garbage collection operation on the bytecode object in accordance with the garbage collection descriptor.

12. The machine-readable storage medium of claim 11, wherein the virtual machine is a Java™ Virtual Machine (JVM), the bytecode object is a Java object, the source code is a Java source code, and the annotation is Java annotation.

13. The machine-readable storage medium of claim 11, wherein the garbage collection descriptor comprises a reference to a garbage collection rule according to which the virtual machine performs the garbage collection operation on the bytecode object.

14. The machine-readable storage medium of claim 13, wherein the garbage collection rule is to instruct the virtual machine to skip a round of garbage collection operations on the bytecode object.

15. The machine-readable storage medium of claim 13, wherein the garbage collection rule is to instruct the virtual machine to keep the bytecode object in the first region regardless of whether the bytecode object has survived the determined number of rounds of garbage collection operations.

16. The machine-readable storage medium of claim 13, wherein the garbage collection rule is to instruct the virtual machine to bypass the first region and to store the bytecode object in the second region.

17. A system comprising:
a memory; and
a processing device of a virtual machine, operationally coupled to the memory, the processing device to:
receive bytecode comprising a bytecode object and garbage collection descriptor associated with the bytecode object, the garbage collection descriptor comprising an identifier of a garbage collection rule stored in a garbage collection rule database, wherein the garbage collection rule database stores a plurality of garbage collection rules specifying garbage collections to be performed on bytecode objects;

responsive to determining that the garbage collection descriptor indicates a first type of garbage collection in view of the garbage collection rule associated with the identifier in the garbage collection descriptor, store the bytecode object in a first region of the memory, wherein the first region is utilized for storing a first set of bytecode objects that have persisted for fewer than a determined number of rounds of garbage collection operations;

responsive to determining that the garbage collection descriptor indicates a second type of garbage collection in view of the garbage collection rule associated with the identifier in the garbage collection descriptor, store the bytecode object directly in a second region of the memory bypassing the first region, wherein the second region is utilized for storing a second set of bytecode objects persisted for at least the determined number of rounds of garbage collection operations in the first region;

responsive to determining that the garbage collection descriptor indicates a third type of garbage collection in view of the garbage collection rule associated with the identifier in the garbage collection descriptor, store the bytecode object directly in a third region of the memory bypassing the first region and second region, wherein the third region is to store a third set of bytecode objects until the third set of bytecode objects are destructed responsive to a class, associated with each of the third set of bytecode objects, being unloaded from the virtual machine; and perform the garbage collection operation on the bytecode object in accordance with the garbage collection descriptor.

18. The system of claim 17, wherein the virtual machine is a Java™ Virtual Machine (JVM), the bytecode object is a Java object, the source code is Java source code, and the annotation is a Java annotation.

* * * * *